United States Patent
Jiang et al.

(10) Patent No.: US 10,468,928 B2
(45) Date of Patent: Nov. 5, 2019

(54) MAGNETIC BALANCE STRUCTURE AND A MAGNETIC BALANCE LINEAR VIBRATION MOTOR

(71) Applicant: Shanghai Source Electrical Co., Ltd., Shanghai (CN)

(72) Inventors: Wenming Jiang, Shanghai (CN); Yixiang Wei, Shanghai (CN)

(73) Assignee: Shanghai Source Electrical Co., Ltd., Shanghai (CN)

( * ) Notice: Subject to any disclaimer, the term of this patent is extended or adjusted under 35 U.S.C. 154(b) by 403 days.

(21) Appl. No.: 15/415,432

(22) Filed: Jan. 25, 2017

(65) Prior Publication Data

US 2018/0212487 A1    Jul. 26, 2018

(51) Int. Cl.
*H02K 7/09* (2006.01)
*H02K 1/34* (2006.01)

(52) U.S. Cl.
CPC ............. *H02K 1/34* (2013.01); *H02K 7/09* (2013.01)

(58) Field of Classification Search
CPC ............. H02K 1/34; H02K 33/16; H02K 7/09
See application file for complete search history.

(56) References Cited

U.S. PATENT DOCUMENTS

| 4,988,905 | A  | * | 1/1991  | Tolmie, Jr. | H02K 29/06 310/68 B |
| 7,554,225 | B2 | * | 6/2009  | Kraus       | H02K 33/18 310/15   |
| 7,615,901 | B2 | * | 11/2009 | Park        | H02K 7/063 310/208  |
| 8,587,165 | B2 | * | 11/2013 | Zahora      | F04D 25/082 310/52  |
| 8,994,235 | B2 | * | 3/2015  | Doll        | H02K 16/02 310/12.14 |
| 2006/0255664 | A1 | * | 11/2006 | Kraus   | H02K 33/16 310/36   |

* cited by examiner

*Primary Examiner* — Dang D Le
(74) *Attorney, Agent, or Firm* — Muncy Geissler, Olds & Lowe, P.C.

(57) ABSTRACT

A magnetic balance structure includes a counter weight, a positioning element, a first positioning magnet, a shell and a shaft. The positioning element is set on the counter weight or the shell and the positioning element is set with the first positioning magnet face-to-face. The shaft is set on the shell. The interaction of the positioning element with the first positioning magnet causes the counter weight to do reciprocating motion along the shaft. Furthermore, A magnetic balance linear vibration motor includes a shell internally provided with a stator, a rotor and a shaft. The stator includes a drive coil driving the rotor cutting its magnetic lines of force, generate driving force, and driving the rotor to do reciprocating linear motion along the shaft. The positioning element and the first positioning magnet are respectively set on the rotor or the shell.

18 Claims, 6 Drawing Sheets

MAGNETIC BALANCE STRUCTURE AND A MAGNETIC BALANCE LINEAR VIBRATION MOTOR

FIELD

The invention relates to the field of reciprocating linear motion, especially relates to a magnetic balance structure and a magnetic balance linear vibration motor.

BACKGROUND

With the rapid development of portable devices such as smart phones, the requirements for the installation of electrical devices are getting higher and higher.

In order to achieve the purpose of saving space and improving quality, electronic components gradually develop to the ultra-small ultra-thin, the main realization such as the caller display, touch feedback effect, also put forward higher requirements on the vibrator. Linear vibration motor replaces the other vibrators because of strong advantage of the height direction.

At present, linear vibration motor which is more used in the smart phone is spring linear vibration motor, the spring linear vibration motor use mechanical metal spring to control the vibration amplitude and vibration level, high difficulty of processing and assembly, it is difficult to control the assembly precision and the adverse rate is very high; and the service life is short, long-term use will produce metal fatigue, metal spring will produce noise, static, affect the use of mobile phones.

SUMMARY

The invention aiming at the problems in the existing technology, proposing a magnetic balance structure and a magnetic balance linear vibration motor, which uses the magnetic principle instead of mechanical spring to achieve good vibration, makes processing and assembly simple, improves the assembly accuracy and qualified rate, and prolongs the service life, reduces the noise.

In order to solve the above-mentioned technical problems, the invention is achieved by the following technical features:

This invention provides a magnetic balance structure, comprising: a counter weight, a positioning element, a first positioning magnet, a shell and a shaft, therein:

the positioning element is set on the counter weight, the first positioning magnet is set on the shell; or, the positioning element is set on the shell, the first positioning magnet is set on the counter weight; and the positioning element is set with the first positioning magnet face-to-face;

the shaft is set on the shell, the counter weight is sleeved on the shaft;

the magnetic force between the positioning element and the first positioning magnet keeps the counter weight to remain horizontal on the same horizontal plane, and when the left and right relative displacement is happen between the positioning element and the first positioning magnet, a restoring force is generated between the positioning element and the first positioning magnet, and the counter weight is returned to the origin along the shaft by the restoring force of the positioning element and the first positioning magnet.

This invention using the magnetic principle: in uniform magnetic field, regularly, magnetically, conductive metal object that moves linearly through the magnetic field to cut the magnetic lines of force can maintain a level of linear motion of the line of magnetic force, the magnetic field force the object a resistance of the movement in the opposite direction, and when the object loses its thrust, rest rapidly on a fixed position. The invention utilizes the magnetic principle to control the motion amplitude and the movement level of the counter weight, and to locate the position of the counter weigh when the counter weight is static.

Preferably, the positioning element is a positioning piece or a second positioning magnet, and when the positioning element is the second positioning magnet, the first positioning magnet and the second positioning magnet are correspondingly arranged in different polar, and the magnetic force between the first positioning magnet and the second positioning magnet not only keeps the counter weight to remain horizontal on the same horizontal plane, but also bear a part of gravity of the counter weight.

Preferably, the number of the first positioning magnet is two, and two first positioning magnets are correspondingly arranged.

Preferably, both the surface of the positioning element which is opposite to the first positioning magnet and the surface of the first positioning magnet which is opposite to the positioning element are middle-convex surface, and the middle-convex of the positioning element corresponds to the middle-convex of the first positioning magnet; the surface of the positioning element opposite to the first positioning magnet is arranged in a bulge-like structure, so that the positioning piece can remain horizontal better.

Preferably, the surface of the positioning element, which is opposite to the surface of the first positioning magnet, is a V-type surface or a trapezoidal surface or an arc-shaped surface or a triangular surface, and, the surface of the first positioning magnet, which is opposite to the positioning element, is a V-type surface or a trapezoidal surface or an arc-shaped surface or a triangular surface, the magnetic force in the middle is the strongest, so that the rotor can be better maintained horizontal.

Preferably, the positioning element and/or the first positioning magnet is fixed in an embedded way, more stable to fix and easier to assemble. Preferably, along the direction of the counter weight movement, the length of the positioning element is no longer than the length of the first positioning magnet, and/or, the vertical width of the positioning element is no longer than the vertical width of the first positioning magnet.

Preferably, along the direction of the counter weight movement, the length of the positioning element is equal to the length of the first positioning magnet, and/or, the vertical width of the positioning element is equal to the vertical width of the first positioning magnet, when the counter weight loses its thrust, the positioning element rest on the position which corresponding to the second positioning magnet, improve the positioning accuracy, speed up the positioning time.

This invention further provides a magnetic balance linear vibration motor, comprising: a shell with an accommodation space, the shell is internally provided with: a stator, a rotor and a shaft, the stator comprises a drive coil, therein:

the rotor is sleeved on the shaft;

when the drive coil is energized, the drive coil drives the rotor to cut the magnetic lines of the drive coil, generate a driving force to drive the rotor make reciprocating linear motion along the shaft;

the rotor is provided with a positioning element, the shell is provided with a first positioning magnet, and the first positioning magnet is located on both sides of the positioning element, and both sides of the positioning element are set with the first positioning magnet face-to-face, the magnetic lines of both sides of the first positioning magnet pass through the positioning element; or, the rotor is provided with the first positioning magnet, the shell is provided with positioning element, the positioning element is located on both sides of the first positioning magnet, and both sides of the first positioning magnet are set with the positioning element face-to-face, the magnetic lines of the first positioning magnet pass through the positioning element;

the magnetic force between the positioning element and the first positioning magnet keeps the rotor to remain horizontal on the same horizontal plane;

when the drive coil is powered up, a left and right relative displacement is happen between the positioning element and the first positioning magnet, a restoring force is generated between the positioning element and the first positioning magnet, under the double action of the restoring force and the driving force, the rotor automatically returns to the origin after reciprocating motion to the left limit point and right limit point;

when the drive coil is powered down, the rotor is stationary at the origin by the magnetic force of the positioning element and the first positioning magnet.

Preferably, the positioning element is a positioning piece or a second positioning magnet, and when the positioning element is the second positioning magnet, the first positioning magnet and the second positioning magnet are correspondingly arranged in different polar, and the magnetic force between the first positioning magnet and the second positioning magnet not only keeps the counter weight to remain horizontal on the same horizontal plane, but also bear a part of gravity of the rotor. the rotor and the shell are provided for positioning magnet, so that the rotor has better balance performance, the restoring force is larger, thus improving the motor performance; in addition, the action between the first positioning magnet and the second positioning magnet can bear part of the weight of the rotor, it is unnecessary for the single shaft to carry the gravity of the rotor alone, so as to reduce the friction of the rotor on the single shaft and the gravity, little wear and long service life.

Preferably, both the surface of the positioning element which is opposite to the first positioning magnet and the surface of the first positioning magnet which is opposite to the positioning element are middle-convex surface, and the middle-convex of the positioning element corresponds to the middle-convex of the first positioning magnet.

Preferably, the surface of the positioning element which is opposite to the first positioning magnet is a V-type surface or a trapezoidal surface or an arc-shaped surface or a triangular surface, and, the surface of the first positioning magnet which is opposite to the positioning element is a V-type surface or a trapezoidal surface or an arc-shaped surface or a triangular surface.

Preferably, the positioning element and/or the first positioning magnet is fixed in an embedded way.

Preferably, the number of the drive coils is two, and two drive coils are set relatively parallel, and the rotor moves between the two drive coils, and the plane motion of the rotor is parallel to the drive coil; and/or, the rotor comprises a counter weight and a movable magnet that connected to each other, the movable magnet is close to the stator, the movable magnet is a planar two-stage magnetizing structure;

when the drive coil is powered up, the movable magnet cut the magnetic lines of the drive coil and make reciprocating rectilinear motion along the shaft; when the first half of the movable magnet passes the drive coil, the force between the first half of the movable magnet and the drive coil pushes the movable magnet to move forward, so as to push the rotor to move forward; when the second half of the movable magnet passes through the drive coil, the reacting force between the second half of the movable magnet and the drive coil pushes the movable magnet to move backward, so as to push the rotor to move backward.

Preferably, the stator further comprises: a circuit board and a cover plate;

the circuit board is set on the side which is two drive coils being back to back;

the cover plate is arranged on the outer side of the circuit board.

Preferably, the movable magnet is embedded in the counter weight or the counter weight is embedded in the movable magnet.

Preferably, the shell is a sealed shell, a damping hole is arranged on the shell, and the damping hole is used for connecting the inner and outer parts of the shell, so as to reduce the resistance and the heating problem when the rotor exercises.

Preferably, the size of the damping hole is related to the size of the inside space of the sealed shell and the size of the rotor; the larger the accommodation space inside the sealed shell, the larger the corresponding size of the damping hole is, and the larger the size of the rotor is, the larger the damping hole will be, an appropriate size of the damping hole is provided in accordance with the size of the accommodation space within the sealed shell and the dimensions of the rotor, which can make the motor to achieve the best performance, the damping hole is so small that damping can not be reduced, and heat dissipation effect is not obvious, the damping hole is so large that there is no damping effect on the vibration performance.

Preferably, the diameter of the damping hole can be any value between 0.2 mm and 0.6 mm.

Preferably, the damping hole is arranged at the bottom or both sides of the shell to prevent dust or something else entering the shell, and then affecting the performance of the motor.

Preferably, along the direction of the rotor movement, the length of the positioning element is no longer than the length of the first positioning magnet, and/or, the vertical width of the positioning element is no longer than the vertical width of the first positioning magnet.

Preferably, along the direction of the rotor movement, the length of the positioning element is equal to the length of the first positioning magnet, and/or, the vertical width of the positioning element is equal to the vertical width of the first positioning magnet.

Compared with the present technique, the invention has the following advantages:

(1) In the existing technology, in order to control the vibration amplitude of the vibration element, two groups of springs which are used for the limit are set at the both ends of the vibration motor, it is very difficult to maintain the elasticity of the springs on both sides, and the production of spring is also very difficult, high production costs, long-term use of spring will produce metal fatigue, short service life; this invention utilizes the magnetic principle to control the motion amplitude and the movement level of the counter weight, which using the magnetic principle to replace the mechanical spring to achieve good vibration, easy to control the movement level, non-contact control, prolongs the service life, makes processing and assembly simple, improves the assembly accuracy and qualified rate.

(2) The magnetic balance structure and the magnetic balance linear vibration motor provided by this invention utilize the magnetic principle, the level and the amplitude of the rotor or the counter weight are kept by the magnetic field, the friction of the parts is small, the abrasion is reduced, the service life is prolonged, and the noise is reduced.

(3) The magnetic balance structure and the magnetic balance linear vibration motor provided by this invention utilize the magnetic principle, under the condition of high temperature, the magnetism will not weaken, so the adaptability is highly;

(4) The magnetic balance structure and the magnetic balance linear vibration motor provided by this invention, the positioning elements on the rotor and the stator can also be set as positioning magnets, the interaction between the two is stronger, so that the balance in the horizontal direction of the rotor is more reliable, and the restoring force of the rotor is stronger, thereby further improving the performance of the motor;

(5) In the existing technology, in order to maintain the vibration level and prevent roll-over, two shafts are used, and the gravity of the vibrating element is supported by the shafts, in order to prevent the shafts from being bent, no one uses a single shaft; the magnetic balance linear vibration motor provided by this invention, when both positioning elements are positioned magnets, by the interaction of the first positioning magnet and second positioning magnet, the vibrating elements are kept horizontal on the same horizontal line and no flipping occurs, and the vibrating elements are always at the same height, the first positioning magnet and the second positioning magnet bear a part of gravity of the vibrating element, so the gravity of the vibrating element is no longer carried by the shaft alone, therefore, the invention can uses a single shaft, simplifies the motor structure, reduces production costs, and has a long service life;

(6) In this invention, the positioning element and/or the first positioning magnet may be fixed in an embedded fixed way, and the moving magnet and the counter weight may be fixed in an embedded fixed way, the glue on the market today is not one hundred percent to ensure that the magnet does not fall by the impact of the magnet and the counter weight, the use of embedded fixed avoid the user in the course of the impact of falling off the risk of magnet, not only improve the reliability of the motor, but also make the motor assembly easier, embedded fixed, the magnet as long as placed into the corresponding hole on the rotor can be, rather than un-embedding fixed needs additional positioning fixture in the assembly process, it will be very complex.

Of course, the implementation of any of the products of the invention does not necessarily need to achieve all of the above advantages.

Label declaration: 1—stator, 2—rotor, 3—shaft, 4—positioning element, 5—the first positioning magnet, 6—shell; 11—bracket, 12—terminal block, 13—drive coil, 14—circuit board, 15—cover plate;

21—counter weight, 22—movable magnet, 23—bearing;

31—shaft sleeve;

41—V-type surface;

61—damping hole.

DETAILED DESCRIPTION OF THE EMBODIMENTS

Further description of this invention is provided combining with specific embodiment in the following, the embodiment of the invention is carried out under the premise of the technical scheme of the invention, and the detailed implementation mode and the specific operation process are given, however, the scope of the invention shall not be limited by of presented embodiments in the following.

No. 1 Embodiment

Figure 1:
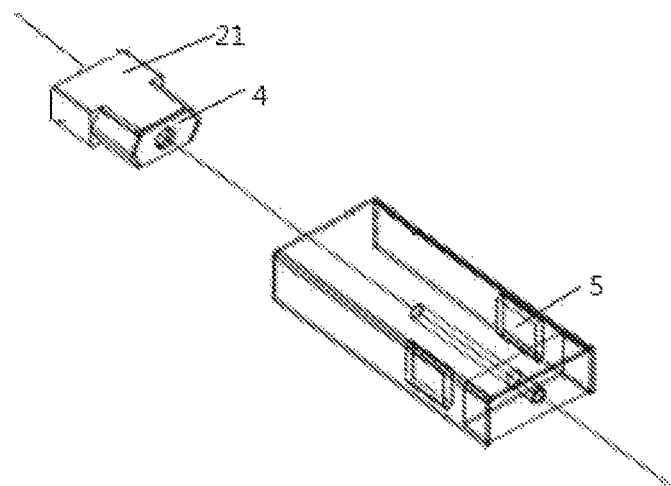
FIG. 1 is a schematic diagram of the decomposition structure of the magnetic balance structure of the No. 1 embodiment.
Figure 2:
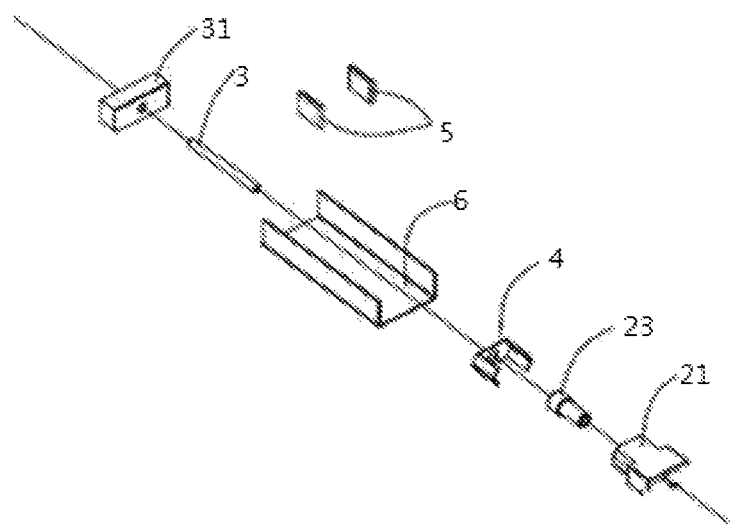
FIG. 2 is a schematic diagram of the assembly structure of the magnetic balance structure of the No. 1 embodiment.

Combining with FIG. 1 to FIG. 2, this embodiment provides a detailed description of the magnetic balance structure of the invention, FIG. 1 is a schematic diagram of the decomposition structure; FIG. 2 is a schematic diagram of the assembly structure; comprising: a counter weight 21, a positioning element 4, a first positioning magnet 5, a shaft 3 and a shell 6, therein, the positioning element 4 is set on the counter weight 21, the first positioning magnet 5 comprises two magnets which are disposed opposite to each other on the shell 6, and the positioning element 4 is set with the first positioning magnet 5 face-to-face; under the magnetic force between the positioning element and the first positioning magnet, the counter weight 21 keeps horizontal on the same horizontal plane, that is, makes the counter weight does not tilt; when the counter weight is thrust, a left and right relative displacement is happen between the positioning element 4 and the first positioning magnet 5, a restoring force is generated between the positioning element 4 and the first positioning magnet 5, when the counter weight is out of thrust, under the restoring force of the positioning element 4 and the first positioning magnet 5, the counter weight 21 is returned to the origin (that is balance position, this position is the positioning element 4 and the first positioning magnet 5 where are set face-to-face) along the shaft 3 that fixed on the shell 6. In this embodiment, the positioning element 4 is a positioning piece. In the different embodiment, the positioning element 4 and the first positioning magnet 5 may not necessarily be arranged in the right and left positions as shown in this embodiment, or can arranged upper and lower vertically.

In this embodiment, the shaft 3 fixed at the shell 6 by a shaft sleeve 31, in the counter weight 21 further comprises the bearing 23, and the counter weight 21 is made to move reciprocating along the shaft 3 by the bearing 23. In different embodiment, the shaft 3 can also be fixed on the shell 6 directly.

In this embodiment, in order to achieve better positioning effect, along the direction of the counter weight 21 movement, the length of the positioning element 4 is equal to the length of the first positioning magnet 5, so that the positioning accuracy of the left and right movement of the positioning element 4 can be better controlled; furthermore, the vertical width of both the positioning element and the first positioning magnet is equal, thus, the magnetic force generated by the first positioning magnet 5 and the positioning element 4 can better maintain the level of the positioning element 4. By the above-mentioned arrangement, it is possible to further improve the accuracy in the case of the linearly reciprocating motion of the counter weight 21, and the positioning element 4 can be stopped more quickly at the position corresponding to the first positioning magnet 5 when the counter weight 21 is out of thrust, when the positioning element 4 and the first positioning magnet 5 are equal in length, at rest, these two match with each other correctly, the static position is easy to be determined, the positioning is more accurate and quicker, the positioning accuracy is improved, the positioning time is shortened and the performance of the magnetic balance structure is further improved.

In this embodiment, in order to make the horizontal level of the positioning element 4 better, the surface of the positioning element 4 opposite to the first positioning magnet 5 is provided in a V-type structure, this structure is similar to the bulge-like structure, so that the positioning element can remain horizontal better while along the magnetic field lines, this is similar to the design principle of the bulge-like structure. In the different embodiment, it can be designed for other middle-convex structure, such as an arc-shaped surface or a triangular surface or a trapezoidal surface and so on, of course, it can be a flat surface.

In this embodiment, the positioning element 4 is set on the counter weight 21, in the different embodiment, the first positioning magnet 5 can also be set on the counter weight 21, and it can also achieve the same effect.

The magnetic balance structure of this embodiment can be used in a linear vibration motor as well as in other reciprocating linear motion structures.

In a preferred embodiment, the bearing 23 is oil bearing; the positioning plate is made of a strong magnetic material such as cold-rolled steel strip, which makes it possible to generate a stronger magnetic spring force in the magnetic force lines generated by the first positioning magnet 5, and further to keep the positioning piece horizontal.

In a preferred embodiment, the positioning element 4 is a second positioning magnet, the positioning element on the counter weight 21 and the shell 6 are set to positioning magnet, so that the counter weight 21 has better balance performance, the restoring force is larger, thus improving the motor performance; in addition, the action between the first positioning magnet and the second positioning magnet can bear part of the weight of the counter weight 21, it is unnecessary for the shaft 3 to bear the gravity of the counter weight 21 alone, so as to reduce the friction and the gravity of the rotor 2 to the shaft 3, little wear and long service life, so in the magnetic balance structure of the invention, the shaft 3 can be single-shaft. In the existing technology, because the gravity of counter weight 21 is undertaken entirely by the shaft, so in order to prevent shaft from bending roll-over, all use biaxial, the structure is complex, and the size of the motor is large.

No. 2 Embodiment

Figure 3:
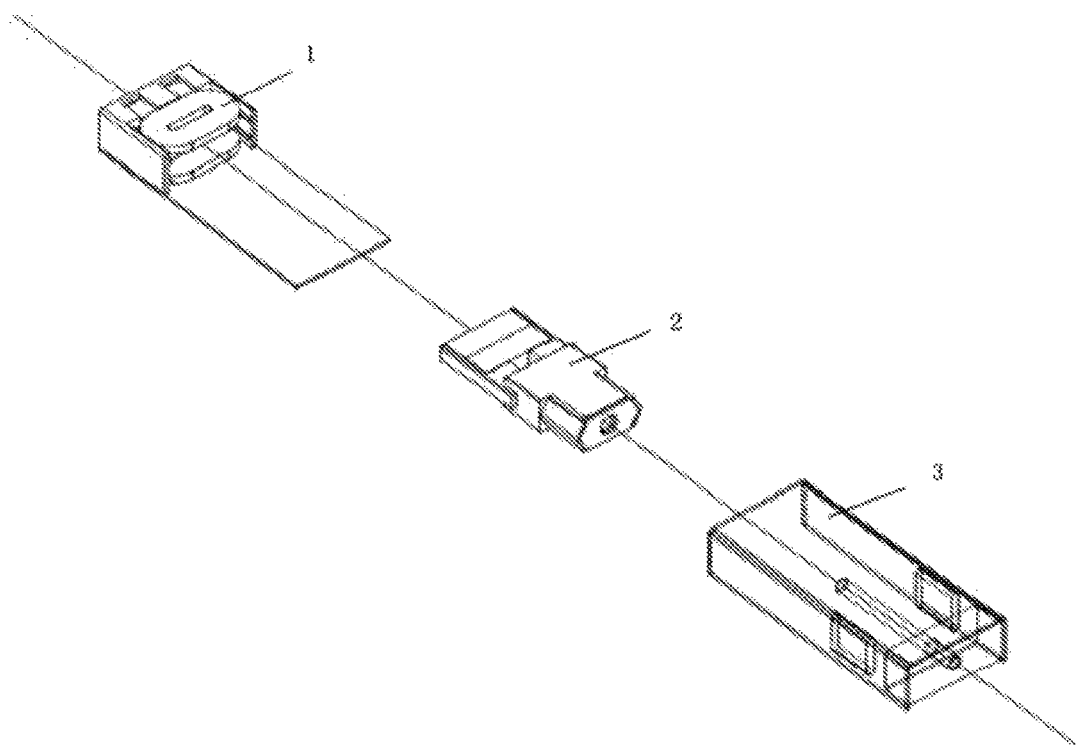
FIG. 3 is a schematic diagram of unit construction of the magnetic balance linear vibration motor of the No. 2 embodiment.

Combining with FIG. 3 to FIG. 6, this embodiment detailed describe the magnetic balanced linear vibration motor of the invention, the movement amplitude and the movement level of the rotor is controlled by the magnetic balance structure bases on the embodiment above. As shown in FIG. 3 is unit construction of the schematic diagram, which can be divided into three parts: the stator 1, the rotor 2 and the shell 6.

Figure 4:
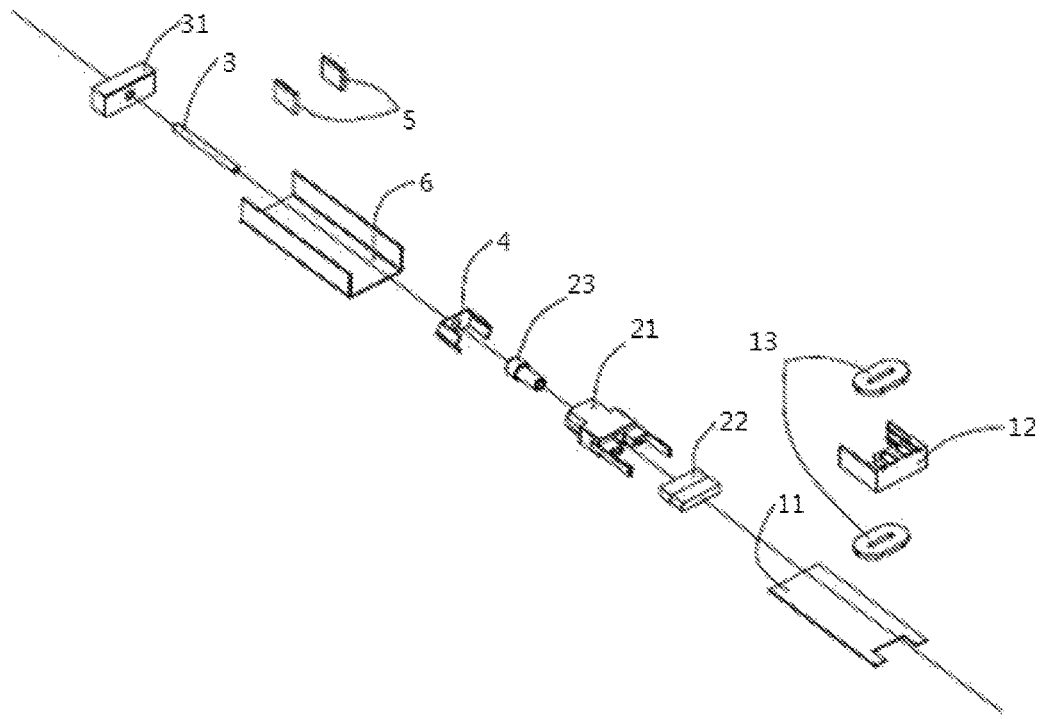
FIG. 4 is a schematic diagram of unit construction of the magnetic balance linear vibration motor of the No. 2 embodiment.

FIG. 4 is a schematic diagram of unit construction of the magnetic balance linear vibration motor of this embodiment, position 1 comprises: bracket 11, terminal block 12, and drive coil 13, the terminal block 12 is set on the bracket 11, the drive coil 13 is set on the terminal block 12. The rotor 2 comprises: the counter weight 21 and the movable magnet 22, the movable magnet 22 is set on the side of the counter weight 21 which is close to the stator 1, When the installation completes, the movable magnet 22 is located between two drive coil 13, the movable magnet 22 is used to cut the line of magnet force which is generated by two drive coil 13 when drive coils are powered up, the first positioning magnet 5, the shaft 3 and the shaft sleeve 31 are set on the shell 6. When the drive coil is powered up, the movable magnet 22 cuts the magnetic field lines of the drive coil 13 and makes reciprocating motion along the stator 1, the movable magnet 22 adapts the planar two-stage magnetization structure in this embodiment, when the first half of the movable magnet 22 pass through the drive coil, the movable magnet 22 is pushed to move forward by the effect generated by the half of magnet field of movable magnet 22 and the drive coil 13, so as to push the rotor 2 to move forward, but when the second half of the movable magnet 22 is moved to generate effect with the drive coil 13, generate the opposite force, pushes the movable magnet 22 to move backward, add the elastic force (resistance force) is generated by the first positioning magnet 5 and the positioning element 4, can make the rotor 2 to do reciprocating linear motion continuously, the movement amplitude and the movement level of the rotor 2 is controlled by the magnetic balance structure; when the drive coil 13 is powered down, the rotor losses the thrust and is kept static in the origin point by the positioning element 4 and the first positioning magnet 5. The positioning 4 is a positioning piece in this embodiment.

Figure 5A:
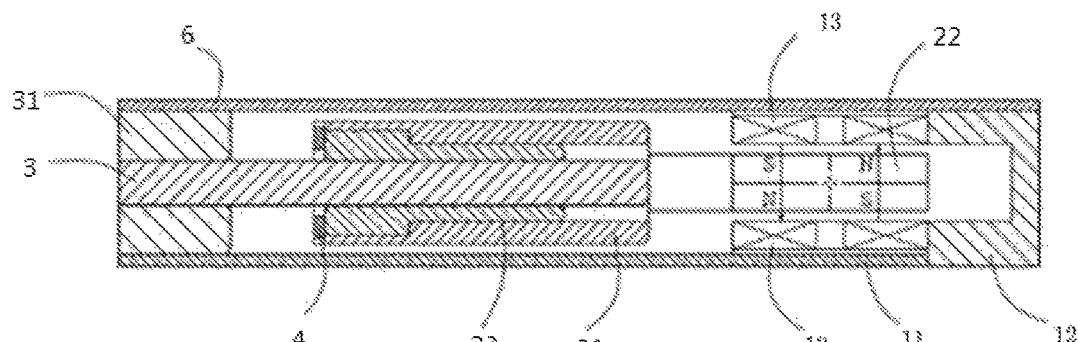
FIGS. 5a to 5c are cross-sectional views of different positions of the magnetic balance linear vibration motor in reciprocating linear motion of the No. 2 embodiment in the invention.
Figure 5B:
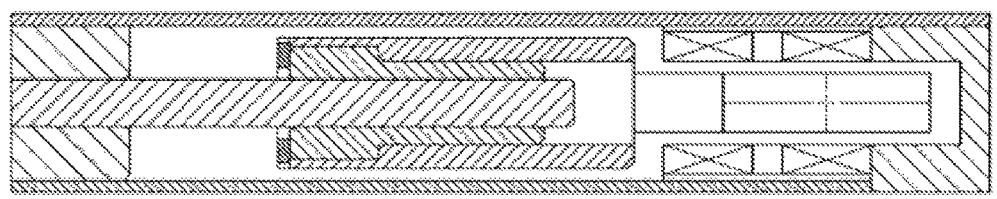
Figure 5C:
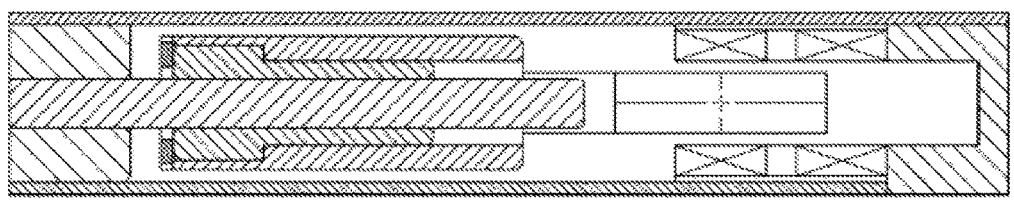
Figure 6:
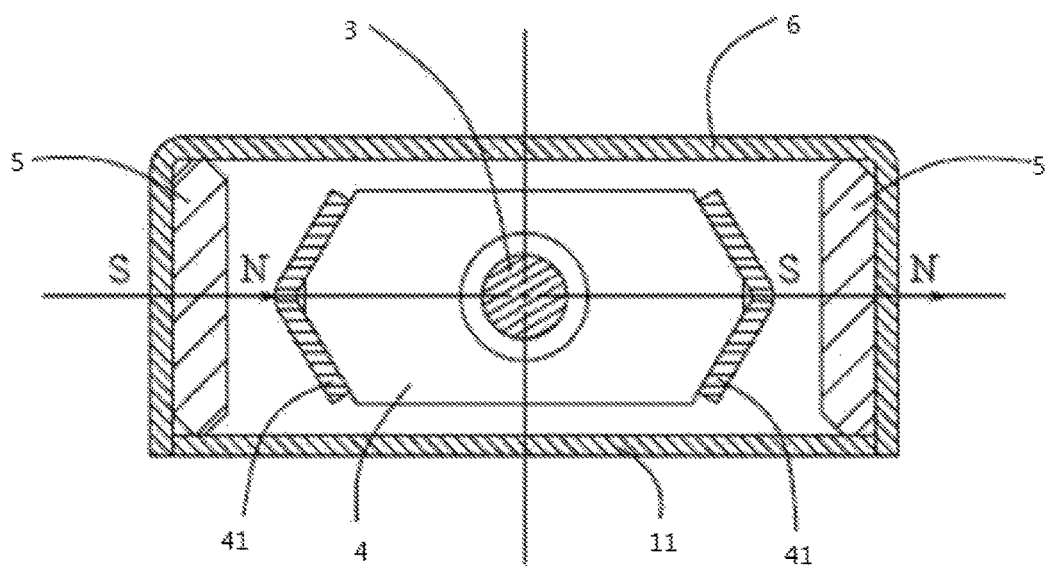
FIG. 6 is a longitudinal cross-sectional view of a magnetically balanced linear vibration motor of the No. 2 embodiment of the invention.

As shown in FIGS. 5a to 5c is a structure diagram of different position of the linear reciprocating motion of the magnetic balance linear vibration motor of the example of execution, FIG. 5a is a cross-sectional view of the motor being located in the middle position (origin), also the rotor 2 is in the middle position when the rotor 2 is static, the first positioning magnet 5 match with the positioning piece; FIG. 5b is a cross-sectional view of the motor which is moving to right when the motor is in the right position; FIG. 5c is a cross-sectional view of the motor which is moving to left when the motor is in the left position. FIG. 6 is a longitudinal-section view of the magnetic balance linear vibration motor of the embodiment, as shown in the figure, the surface, which the positioning piece is opposite to the first positioning magnet 5, is the V-type surface 41, the magnet field, which is generated by the magnetic line of force which is generated by the first positioning magnet 5 passing through the positioning piece, can effectively ensure that the positioning element 4 keeps horizontal well, so as to ensure that rotor is keeps horizontal well.

No. 3 Embodiment

Figure 7:
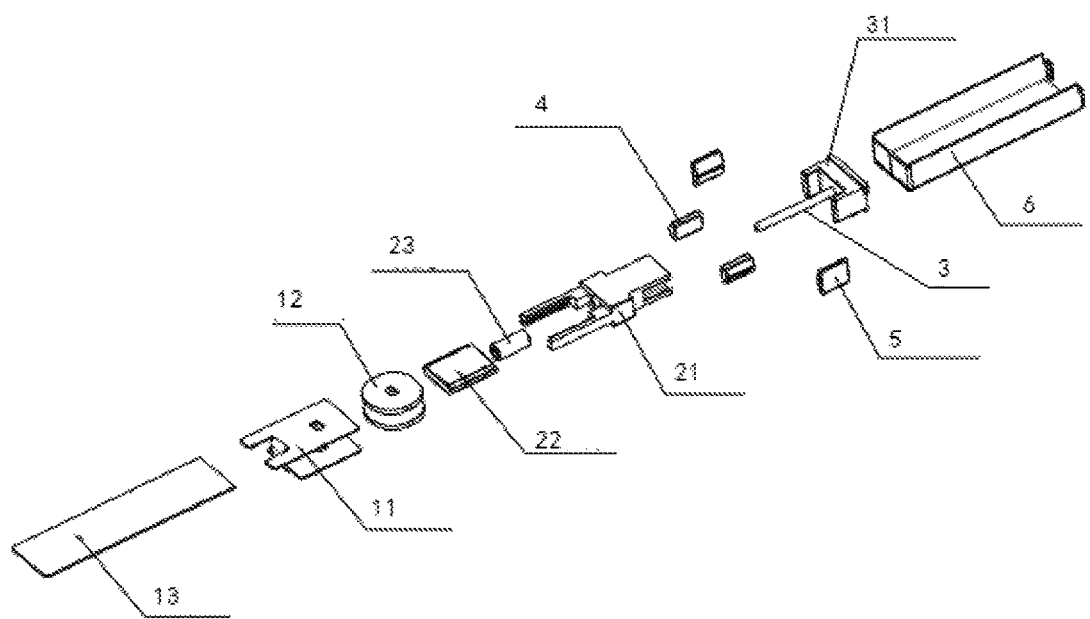
FIG. 7 is an exploded view of the magnetically balanced linear vibration motor of the No. 3 embodiment of the invention.

In this embodiment, the positioning element 4 can also be set as positioning magnet, is the second positioning magnet, as shown in FIG. 7 is explosion diagram, the second positioning magnet move in the same horizontal level and can semi-suspends on the shaft 3 by the force of the first positioning magnet and the second positioning magnet, a part of the gravity is bear by the force between two positioning magnets instead of bear by the shaft 3 alone, and the rotor 2 and the shaft 3 moved each other without any touch, so as to not only the load of the shaft 3 is reduced but also the friction is reduced, prolongs the service life of the shaft 3.

Figure 9:
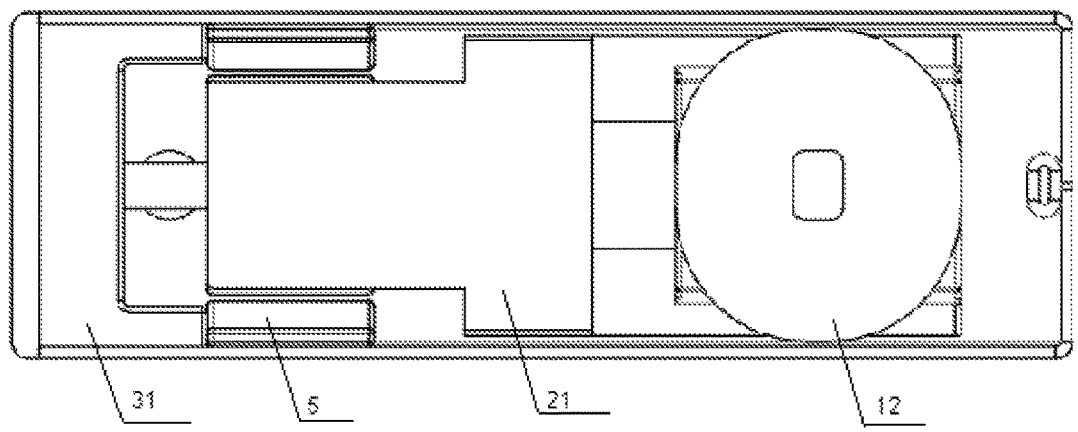
FIG. 9 is a plan view of a magnetically balanced linear vibration motor of the No. 3 embodiment of the invention.

Besides, some improvement is made on the stator 1, as shown in FIG. 7 is an explosion diagram of the magnetic balance linear vibration motor, as shown in FIG. 9 is a top view of the magnetic balance linear vibration motor which is after installation, in the embodiment, the stator 1 comprises: drive coil 13, circuit board 14 and cover plate 15, drive coil 13 include two drive coils, two drive coils are arranged in parallel, and two drive coils are arranged in parallel to the direction of the motion of the rotor; circuit board 11 also includes two circuit boards, two circuit boards are arranged in parallel, two drive coils 12 are pasted on the side of two circuit board 11 respectively, in different embodiment, circuit board 11 can also be a unitary structure, the middle is the bending structure; the cover plate 13 is set on the top of the circuit board 11 to protect the stator 1 from external environment. In this embodiment, the set of the structure of the stator, which can minify the size of the stator, enlarge the inner space of the motor, has simple structure, easy to install and reduce the production cost of the motor. In a preferred embodiment, the circuit board 11 is FPC.

Figure 10A:
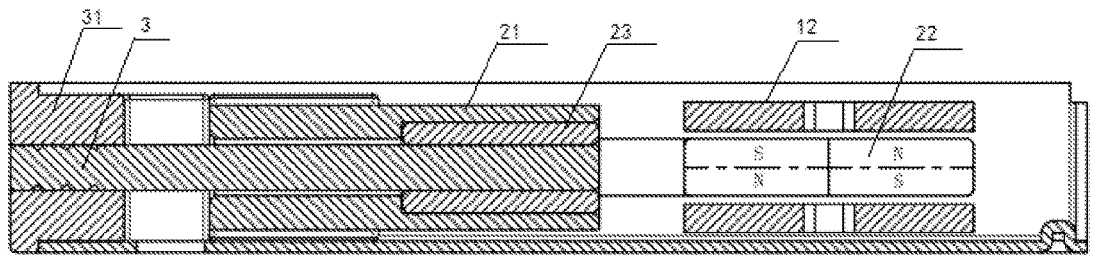
FIGS. 10a to 10c are schematic cross-section views of different positions of the movement of the magnetic balance linear vibration motor of the embodiment 3 of the invention in reciprocating linear motion.
Figure 10B:
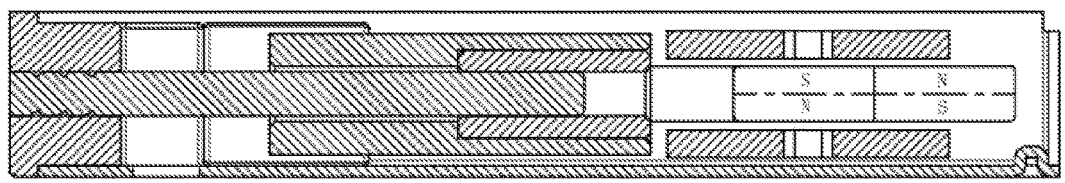
Figure 10C:
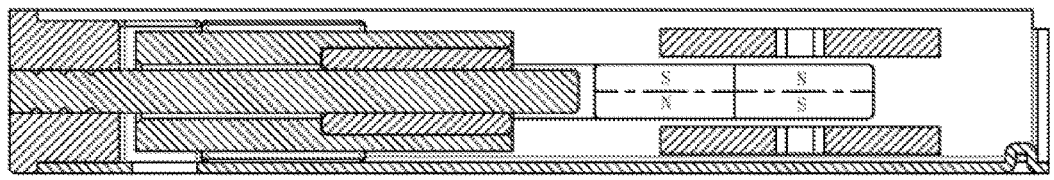

The work principle of the magnetic balance linear vibration motor in the embodiment is: two coils generate magnetic line of force when the stator 1 is powered up, the movable magnet 22 of the rotor 2 cut the magnetic line of force to provide the motion of the rotor 2 with power, so as to make the rotor 2 move reciprocating; the rotor 2 is made to move linearly by the force of the first positioning magnet 4 and the second positioning magnet 5, and it is impossible that the rotor 2 turn around, and it can limit the left and right amplitude of the motion of the rotor 2. As shown in FIG. 10a-10c is a structure diagram of different position of the linear vibration motor in the invention when the motor is moving linearly in the invention. FIG. 10a is a cross-section view of the motor being in the middle, and the rotor 2 is also in this position when it is static, the first positioning magnet 4 matches with the second positioning magnet 5 at present; FIG. 10b is a cross-sectional view of the motor when the motor is in the right position, the first positioning magnet 4 is pulled to left by the restoring force between the first positioning 4 and the second positioning magnet 5; FIG. 10c is a cross-sectional view of the motor when the motor is in the left position, the first positioning magnet 4 is pulled to right by the restoring force between the first positioning 4 and the second positioning magnet 5; the restoring force between the first positioning 4 and the second positioning magnet 5 limits the left and right moving amplitude of the first positioning magnet 4.

Figure 11:
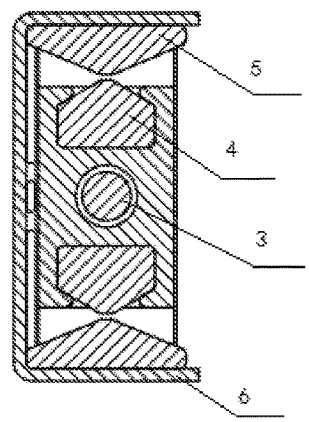
FIG. 11 is a schematic longitudinal cross-sectional view of a magnetically balanced linear vibration motor of the No. 3 embodiment of the invention.

As is shown in FIG. 11, is a schematic longitudinal cross-sectional view of a magnetically balanced linear vibration motor, as is shown in Figure, the surface of the first positioning magnet 4, which is opposite to the second positioning magnet, is a trapezoidal surface, the surface of the second positioning magnet 5, which is opposite to the first positioning magnet 4, is a trapezoidal surface, and this two correspond to the same size, the size of the top edge of the trapezoidal surface is the same, the effect of this two is better, the magnetic force between the top edges of the trapezoidal surfaces is maximized and can be better maintained horizontally and maintained at intermediate heights, so that the rotor 2 is steadily better semi-suspended on the shaft 3.

Figure 8:
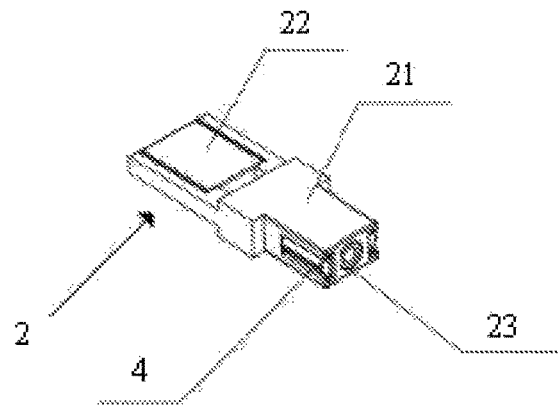
FIG. 8 is a schematic view of a rotor of a magnetically balanced linear vibration motor of the No. 3 embodiment of the invention.

In this embodiment, the second positioning magnet is fixed in an embedded way, as is shown in FIG. 8, the counter weight 21 is embedded into the position of the second positioning magnet and form a shape corresponding to the outer shape of the second positioning magnet, so that the outside is semi-closed state, so that the second positioning magnet can be fixed, and the outside triangular portion of the second positioning magnet can be attracted to the first positioning magnet 5, the magnetism is not shielded, as the counter weight was hollowed out, easily get deformed during the production, so the production of the counter weight has a very high demand, each parts of the motor are paste to fixed in the existing technology, this invention firstly proposes an embedded fixing way, not only ensure the reliability, further improve the performance and prolongs the service life of the motor, but also simplify the assembly process and reduce the difficulty of assembly. In a preferred embodiment, the first positioning magnet 5 also used the same method of fixation.

In a preferred embodiment, the movable magnet 22 is fixed in an embedded way, for an example, the movable magnet 22 may be embedded in the counter weight 21, or the counter weight 21 may be embedded in the movable magnet 22, in view of the vibration motor size is relatively small, the operation is difficult, the parts of the motor are paste to fixed among the existing vibration motor components, in this way, the vibration motor is easy to fall off when it comes to the strong vibration (such as falling or impact, etc); In this embodiment, the counter weight 21 is first molded to a corresponding shape, and then the movable magnet 22 is embedded in the counter weight 21 by using an automatic device, to overcome the instability shortcomings of the existing paste way, not only ensure the reliability, further improve the performance and prolongs the service life of the motor, but also simplify the assembly process and reduce the difficulty of assembly, just put the counter weight 21 or movable magnet 22 embedded in the structure that being made. In the different embodiment, the counter weight 21 and the movable magnet 22 can be a unitary structure.

No. 4 Embodiment

Figure 12:
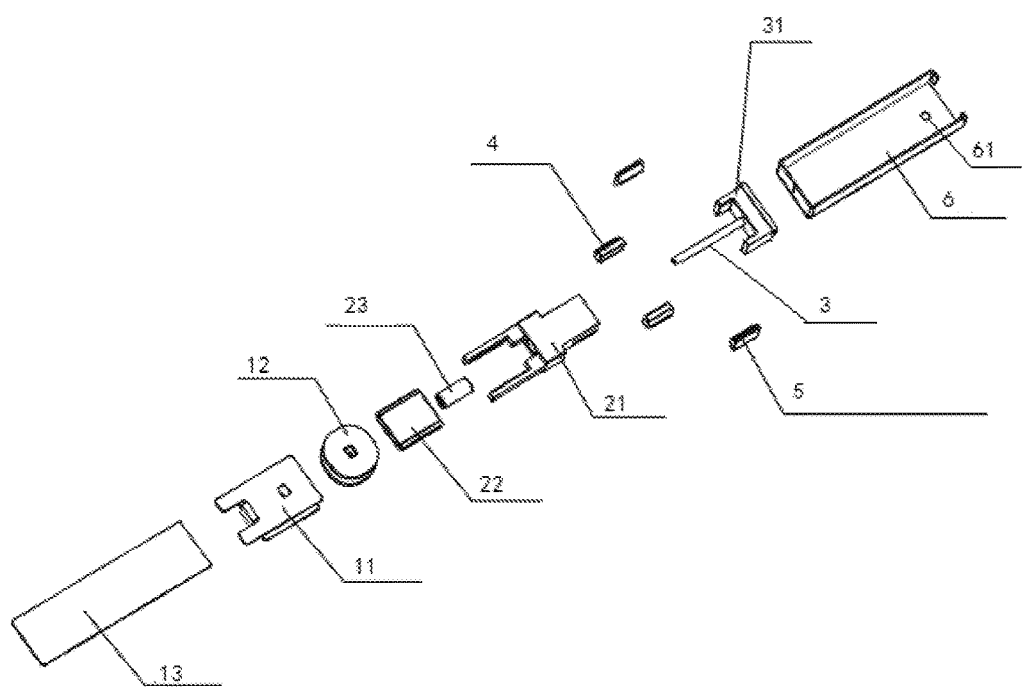
FIG. 12 is an exploded view of a magnetically balanced linear vibration motor of the No. 3 embodiment of the invention.

This embodiment is based on the No. 2 embodiment or the No. 3 embodiment, the shell 6 is provided as a sealed shell, and a damping hole 61 is provided on the sealed shell, as is shown in FIG. 12. The shell 6 is set to be sealed so that the motor is not affected by the surrounding environment; but the heat, which is generated by the motor moving reciprocating in high-frequency in a sealed space, causes heat expansion of the space of air, resulting in accelerated aging of the components in sealed space, and do high-frequency movement in sealed space increase the movement resistance, and decrease the performance of linear motions of the motor, therefore, a damping hole 61 is arranged on the shell to communicate with the outside, so as to reduce the resistance and the heating problem when the rotor is turning, in order to enhance the performance of motor.

In the different embodiment, the size of the damper hole 61 can be set as required, an appropriate size of the damping hole is set according to the size of the accommodation space inside the sealed shell and the size of the rotor, which can make the motor to achieve the best performance, the damping hole is much smaller that damping is reduced and heat dissipation effect is not obvious, the damping hole is much larger that there is no damping effect on the vibration performance, it is similar to the principle of bicycle pump. Preferably, the diameter of the damping hole can be any value between 0.2 mm and 0.6 mm, the damping hole is arranged in the range, and the performance of the vibration motor is superior.

In the different embodiment, the damping hole 61 may include one or more.

In a preferred embodiment, the damping hole is arranged at the bottom or both sides of the shell to prevent dust or something else entering the shell, and then affecting the performance of the motor.

The magnetic balance linear vibration motor of this invention can be used on the mobile phone to vibrate and other products, to keep the reciprocating vibration horizontal and control the static position of the rotor.

The above preferred implementations are only used to illustrate the invention. The preferred embodiment does not detail all of the details, nor does it limit the specific embodiments of the invention was only referred to. Obviously, under the teaching of the invention, simple substitutions and modifications made by persons skilled in the art are within the protection range of the invention. The invention is only to be limited by the claim and all of its scope and equivalents.

The invention claimed is:

1. A magnetic balance structure, comprising:
a counter weight;
a positioning element disposed at a first end of the counter weight;
a shell;
a first positioning magnet set on the shell;
a shaft set on the shell; and
a movable magnet disposed at a second end of the counter weight opposite to the first end,
wherein the positioning element is set with the first positioning magnet face-to-face,
wherein the counter weight is sleeved on the shaft, and
wherein the magnetic force between the positioning element and the first positioning magnet keeps the counter weight to remain horizontal on the same horizontal plane, and when the left and right relative displacement is happen between the positioning element and the first positioning magnet, a restoring force is generated between the positioning element and the first positioning magnet, and the counter weight is returned to the origin along the shaft by the restoring force of the positioning element and the first positioning magnet.

2. The magnetic balance structure of claim 1, wherein the positioning element is a positioning piece or a second positioning magnet, and when the positioning element is the second positioning magnet, the first positioning magnet and the second positioning magnet are correspondingly arranged in different polar, and the magnetic force between the first positioning magnet and the second positioning magnet not only keeps the counter weight to remain horizontal on the same horizontal plane, but also bears a part of gravity of the counter weight.

3. The magnetic balance structure of claim 2, wherein the number of the first positioning magnet is two, and two first positioning magnets are correspondingly arranged.

4. The magnetic balance structure of claim 2, wherein both the surface of the positioning element which is opposite to the first positioning magnet and the surface of the first positioning magnet which is opposite to the positioning element are middle-convex surface, and the middle-convex of the positioning element corresponds to the middle-convex of the first positioning magnet.

5. The magnetic balance structure of claim 4, wherein the surface of the positioning element, which is opposite to the surface of the first positioning magnet, is a V-type surface or a trapezoidal surface or an arc-shaped surface or a triangular surface, and,
the surface of the first positioning magnet, which is opposite to the positioning element, is a V-type surface or a trapezoidal surface or an arc-shaped surface or a triangular surface.

6. The magnetic balance structure of claim 2, wherein the positioning element and/or the first positioning magnet is fixed in an embedded way.

7. The magnetic balance structure of claim 2, wherein along the direction of the counter weight movement, the length of the positioning element is no longer than the length of the first positioning magnet, and/or,
the vertical width of the positioning element is no longer than the vertical width of the first positioning magnet.

8. The magnetic balance structure of claim 2, wherein along the direction of the counter weight movement, the length of the positioning element is equal to the length of the first positioning magnet, and/or,
the vertical width of the positioning element is equal to the vertical width of the first positioning magnet.

9. A magnetic balance linear vibration motor, comprising:
a shell with an accommodation space, the shell being internally provided with:
a stator, comprising a drive coil;
a shaft; and
a rotor sleeved on the shaft;
wherein, when the drive coil is energized, the drive coil drives the rotor to cut the magnetic lines of the drive coil, generate a driving force to drive the rotor make reciprocating linear motion along the shaft,
wherein the rotor is provided with a positioning element, the shell is provided with a first positioning magnet, and the first positioning magnet is located on both sides of the positioning element, and both sides of the positioning element are set with the first positioning magnet face-to-face, the magnetic lines of both sides of the first positioning magnet pass through the positioning element; or, the rotor is provided with the first positioning magnet, the shell is provided with positioning element, the positioning element is located on both sides of the first positioning magnet, and both sides of the first positioning magnet are set with the positioning element face-to-face, the magnetic lines of the first positioning magnet pass through the positioning element, wherein the magnetic force between the positioning element and the first positioning magnet keeps the rotor to remain horizontal on the same horizontal plane, wherein when the drive coil is powered up, a left and right relative displacement is happen between the positioning element and the first positioning magnet, a restoring force is generated between the positioning element and the first positioning magnet, under the double action of the restoring force and the driving force, the rotor automatically returns to the origin after reciprocating motion to the left limit point and right limit point, wherein when the drive coil is powered down, the rotor is stationary at the origin by the magnetic force of the positioning element and the first positioning magnet, wherein the positioning element is a positioning piece or a second positioning magnet, and when the positioning element is the second positioning magnet, the first positioning magnet and the second positioning magnet are correspondingly arranged in different polar, and the magnetic force between the first positioning magnet and the second positioning magnet not only keeps the counter weight to remain horizontal on the same horizontal plane, but also bears a part of gravity of the rotor, wherein the number of the drive coils is two, and two drive coils are set relatively parallel, and the rotor moves between the two drive coils, and the plane motion of the rotor is parallel to the drive coil, wherein the rotor comprises a counter weight and a movable magnet that connected to each other, the movable magnet is close to the stator, the movable magnet is a planar two-stage magnetizing structure, and wherein when the drive coil is powered up, the movable magnet cut the magnetic lines of the drive coil and make reciprocating rectilinear motion along the shaft; when the first half of the movable magnet passes the drive coil, the force between the first half of the movable magnet and the drive coil pushes the movable magnet to move forward, so as to push the rotor to move forward; when the second half of the movable magnet passes through the drive coil the reacting force between the second half of the movable magnet and the drive coil pushes the movable magnet to move backward, so as to push the rotor to move backward.

10. The magnetic balance linear vibration motor of claim 9, wherein both the surface of the positioning element which is opposite to the first positioning magnet and the surface of the first positioning magnet which is opposite to the positioning element are middle-convex surface, and the middle-convex of the positioning element corresponds to the middle-convex of the first positioning magnet.

11. The magnetic balance linear vibration motor of claim 10, wherein the surface of the positioning element which is opposite to the first positioning magnet is a V-type surface or a trapezoidal surface or an arc-shaped surface or a triangular surface, and, the surface of the first positioning magnet which is opposite to the positioning element is a V-type surface or a trapezoidal surface or an arc-shaped surface or a triangular surface.

12. The magnetic balance linear vibration motor of claim 9, wherein the positioning element and/or the first positioning magnet is fixed in an embedded way.

13. The magnetic balance linear vibration motor of claim 9, wherein the stator further comprises:

a circuit board and a cover plate;

the circuit board is set on the side which is two drive coils being back to back;

the cover plate is arranged on the outer side of the circuit board.

14. The magnetic balance linear vibration motor of claim 9, wherein the movable magnet is embedded in the counter weight or the counter weight is embedded in the movable magnet.

15. The magnetic balance linear vibration motor of claim 9, wherein the shell is a sealed shell, a damping hole is arranged on the shell, and the damping hole is used for connecting the inner and outer parts of the shell, so as to reduce the resistance and the heating problem when the rotor exercises.

16. The magnetic balance linear vibration motor of claim 15, wherein the size of the damping hole is related to the size of the inside space of the sealed shell and the size of the rotor.

17. The magnetic balance linear vibration motor of claim 9, wherein along the direction of the rotor movement, the length of the positioning element is no longer than the length of the first positioning magnet, and/or, the vertical width of the positioning element is no longer than the vertical width of the first positioning magnet.

18. The magnetic balance linear vibration motor of claim 17, wherein along the direction of the rotor movement, the length of the positioning element is equal to the length of the first positioning magnet, and/or, the vertical width of the positioning element is equal to the vertical width of the first positioning magnet.

* * * * *